United States Patent [19]
Cheung et al.

[11] Patent Number: 6,092,167
[45] Date of Patent: Jul. 18, 2000

[54] ROBUST INTERFACE FOR HIGH SPEED MEMORY ACCESS

[75] Inventors: Cyrus Cheung, Hercules; Darren Jones, Mountain View, both of Calif.

[73] Assignee: LSI Logic Corporation, Milpitas, Calif.

[21] Appl. No.: 09/045,256

[22] Filed: Mar. 20, 1998

[51] Int. Cl.[7] .................................................. G06F 12/00
[52] U.S. Cl. ........................ 711/169; 711/100; 711/170
[58] Field of Search .................................. 711/167, 168, 711/169, 170, 100; 365/194, 195

[56] References Cited

U.S. PATENT DOCUMENTS

| | | | |
|---|---|---|---|
| 4,980,819 | 12/1990 | Cushing et al. | 712/30 |
| 5,875,346 | 2/1999 | Luick | 395/800.01 |
| 5,895,498 | 4/1999 | Ueno et al. | 711/169 |
| 5,909,701 | 6/1999 | Jeddeloh | 711/167 |
| 5,920,899 | 7/1999 | Chu | 711/169 |
| 5,926,838 | 7/1999 | Jeddeloh | 711/167 |

*Primary Examiner*—John W. Cabeca
*Assistant Examiner*—Fred F. Tzeng

[57] ABSTRACT

A memory interface for synchronous burst SRAMs is provided. In one embodiment, an information processing system comprises a processor and a memory coupled by a memory interface. The memory interface includes a left data latch and a right data latch. The left data latch latches and holds data provided by the memory until the processor accepts it. The right data latch latches and holds data provided by the memory if the left data latch is already latched. Each data latch is freed after its contents have been provided to the processor. A multiplexer is included to steer the least-recently latched data to the processor. The latches and multiplexer are controlled by an interface controller which tracks the state of the latches and the order in which they latched. The interface controller generates control signals in response to the state of the latches and signals from the processor and the memory. The memory interface advantageously operates to maintain the availability of addressed data from memory during interruptions of the processor so that no additional memory access cycles are lost when memory access is restarted by the processor.

10 Claims, 4 Drawing Sheets

ROBUST INTERFACE FOR HIGH SPEED MEMORY ACCESS

BACKGROUND OF THE INVENTION

1. Field of the Invention

This invention relates to the field of high speed information processing systems, and in particular to a memory interface for synchronous memories which provides high speed access.

2. Description of the Related Art

The demand for high performance communications and information processing systems is driving the clock rates of these systems higher. The increase in processor speeds is being followed by an increase in system bus speeds and increases in memory speeds. Two main types of memories exist: DRAMs and SRAMs. DRAMs (dynamic random access memories) are the most common kind of random access memory for personal computers and workstations. DRAMs consist of a network of capacitors upon which are stored electric charges representing binary 0's and 11's. Since the amount of charge is very small, each of the capacitors must have its charge refreshed every few milliseconds to prevent the data from being lost. Due to the small size of the charges, very accurate sensing circuits are provided for detecting the stored data. The access speed of DRAMs is largely limited by the sensing circuitry.

SRAMs (static random access memories) are typically used for data caches or high performance memory applications due to their higher speed and higher cost. SRAMs consist of a network of flip-flops which actively latch a voltage state at a given node. Since the flip-flops are powered, the memory accesses to SRAMs is much faster than to DRAMs.

Various architectural adaptations of SRAMs and DRAMs have been made in the last few years to reduce memory access times. These adaptations include: providing on-chip memory control circuitry, using clocked inputs, pipelining memory accesses, and using latches to provide relaxed timing constraints. These adaptations allow access to sequential memory locations faster than the underlying memory technology would otherwise support. When accompanied by improvements in the memory technology in the form of improved processing and reduced cell sizes, the memories are becoming very fast indeed.

A memory known as Synchronous burst SRAM has recently been developed. Unlike asynchronous SRAM in which reads and writes are performed in a sequential fashion, with one operation completed before the next begins, Synchronous burst SRAM allows a second data access to begin before the first is completed. This allows burst transfer rates as high as 100 MB per second. The chip is designed to take in an address on the rising edge of the clock. The address and certain control information are latched on the clock edge. The latch drives the address decoders, which drive the memory array, and 9 ns or so later, data is available. The chip may include an internal burst counter so it can provide consecutive words of data in response to one address cycle. Some versions of the chip are provided with an output data latch which adds an initial access cycle but relaxes timing constraints on the chip.

The access time for the first word of data is two cycles (three for the versions with the output latch), and subsequent data words are available at one cycle intervals thereafter. Whenever the data flow is interrupted, an additional cycle or two is required to get it restarted. This may prove harmful to the system performance if interruptions are frequent, particularly to systems requiring high data bandwidths such as communications systems. A method for avoiding the repeated loss of initial access cycles would be beneficial to these systems, and is therefore desirable.

SUMMARY OF THE INVENTION

The problems outlined above are in large part solved by a memory interface for synchronous burst SRAMs. In one embodiment, an information processing system comprises a processor and a memory coupled by a memory interface. The memory interface includes a left data latch and a right data latch. The left data latch latches and holds data provided by the memory until the processor accepts it. The right data latch latches and holds data provided by the memory if the left data latch is already latched. Each data latch is freed after its contents have been provided to the processor. A multiplexer is included to steer the least-recently latched data to the processor. The latches and multiplexer are controlled by an interface controller which tracks the state of the latches and the order in which they latched. The interface controller generates control signals in response to the state of the latches and signals from the processor and the memory. The memory interface advantageously operates to maintain the availability of addressed data from memory during interruptions of the processor so that no additional memory access cycles are lost when memory access is restarted by the processor.

BRIEF DESCRIPTION OF THE DRAWINGS

Other objects and advantages of the invention will become apparent upon reading the following detailed description and upon reference to the accompanying drawings in which.

Figure 1A:
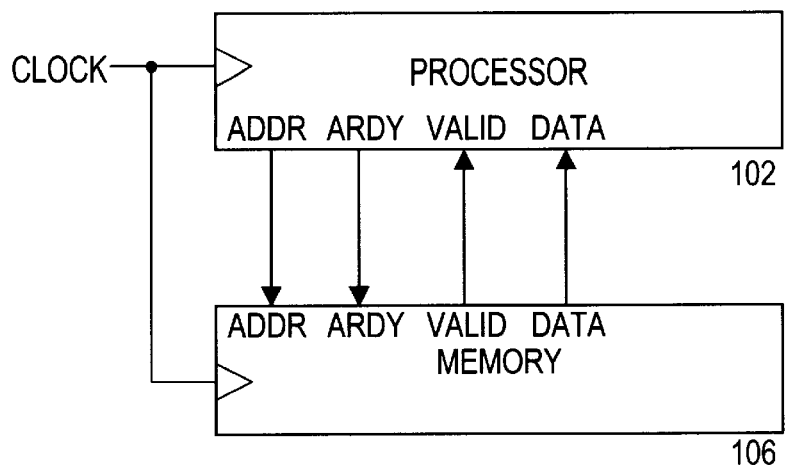
FIG. 1a is a block diagram of a system having a flow-through synchronous burst SRAM.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1A shows a block diagram of a system having a processor 102 and a synchronous burst SRAM 106. In one embodiment, memory 106 is a dual ported memory which stores data provided through a write port (not shown). Such a memory is commonly used to buffer data provided from a high-speed communications link. To read data from memory 106, processor 102 provides an address signal (ADDR) indicative of the location of the desired data to memory 106, and asserts an address ready signal (ARDY). On the next upward transition of the clock signal (CLOCK) memory 106 reads the address signal, and on the following upward transition of the clock signal memory 106 provides the desired data (DATA) and asserts a valid data signal (VALID). While waiting for the data from memory 106, processor 102 may provide an address of subsequently desired data to memory 106, and memory 106 will fill the request in turn.

Figure 2A:
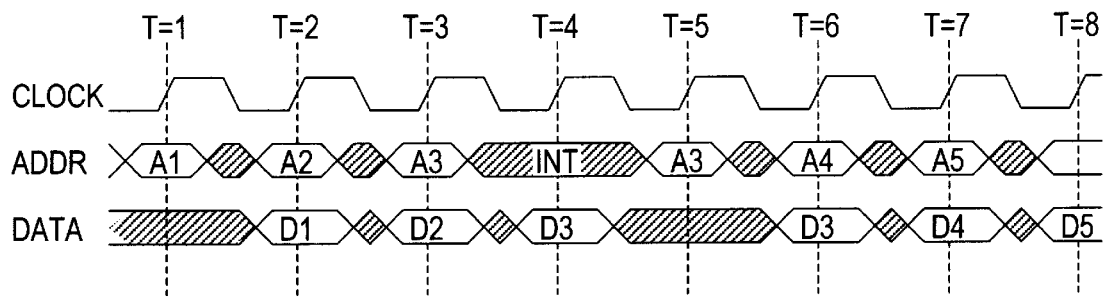
FIG. 2a illustrates the timing requirements for a system having a flow-through synchronous burst SRAM.

FIG. 2A illustrates the signal timing of the system in FIG. 1A. The upward transitions of the clock signal are marked by dashed lines labeled T=1 through T=8. At T=1,2,3, the processor 102 provides addresses A1, A2, and A3 to memory 106. Memory 106 replies with corresponding data D1, D2, and D3 from the addressed memory locations at times T=2, T=3, and T=4. For the sake of illustration, assume the processor 102 is interrupted at time T=4. The duration of the interruption is unimportant to the current issue, so the interruption is assumed to have a one-cycle duration. As a result of the interruption, processor 102 is unable to accept the data D3 which is available at time T=4. Hence, after the interruption is concluded, processor 102 again provides address A3 at time T=5. The processor is then able to receive data D3 at time T=6 rather than at the original time T=4. It is observed that in this configuration, an n-cycle interruption causes an (n+1)-cycle interruption in the data flow.

Figure 1B:
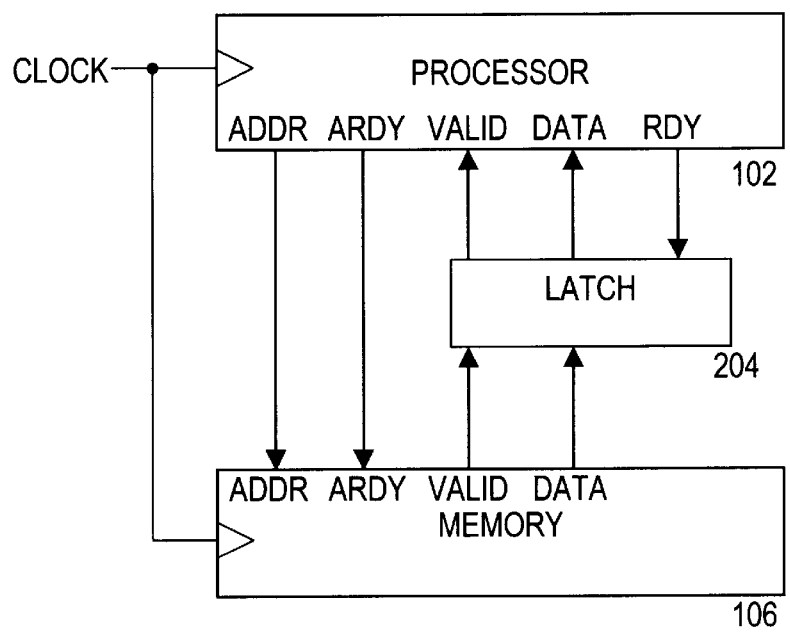
FIG. 1b is a block diagram of a system having a pipelined synchronous burst SRAM.

FIG. 1B shows a block diagram of a system much like that of FIG. 1A. In FIG. 1B, a data latch 204 is provided between the memory 106 and the processor 102. The data latch 204 acts to hold data retrieved from memory until it is read by processor 102. Data latch 204 latches if the valid data signal is asserted. Processor 102 provides a ready signal (RDY) to latch 204 to indicate when it is able to read the data. This signal allows the latch 204 to release the latched data.

Figure 2B:
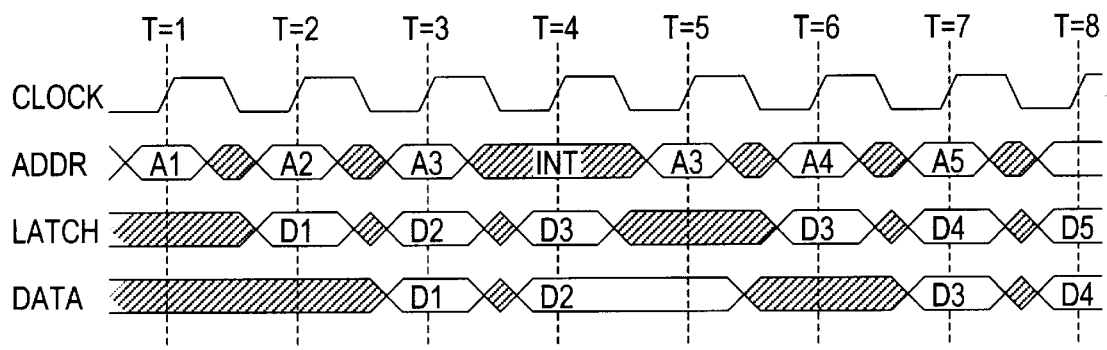
FIG. 2b illustrates the timing requirements for a system having a pipelined synchronous burst SRAM.

FIG. 2B illustrates the signal timing of the system in FIG. 1B. At times T=1,2,3, processor 102 provides addresses A1, A2, and A3 to memory 106. Memory 106 provides the corresponding data D1, D2, and D3 to latch 204 at times T=2,3,4. The latch 204 provides the data to processor 102 at times T=3,4,5. Again, assume that the processor 102 is interrupted at time T=4. Since the processor 102 is unable to accept the data D2 which is available at time T=4, the latch 204 is not released, and data D3 is not latched. Hence, after the interruption is concluded, processor 102 again provides address A3 at time T=5. The processor is then able to receive data D3 at time T=7 rather than at time T=5. In this configuration too, an n-cycle interruption causes an (n+1) cycle interruption in the data flow.

Figure 3:
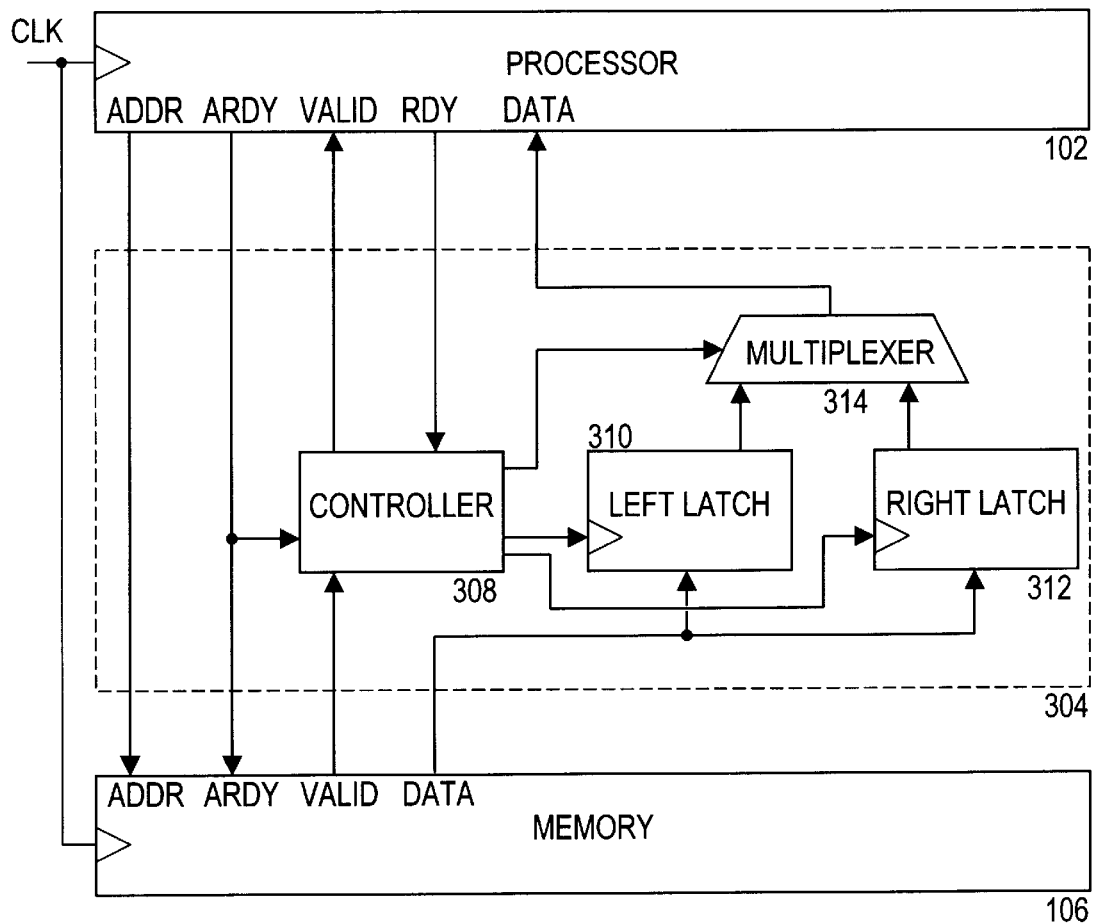
FIG. 3 is a block diagram of a system having an improved memory interface to a synchronous burst SRAM.

FIG. 3 shows a block diagram of a system having an improved memory interface 304 coupled between processor 102 and memory 106. Interface 304 includes an interface controller 308, a left latch 310, a right latch 312, and a multiplexer 314. As data is provided from memory 106, it is loaded into left latch 310 or right latch 312 as determined by controller 308. The data is steered to processor 102 by controller 308 using multiplexer 114. As data is accepted by processor 102, the controller releases latched 310, 312 for subsequent data. This configuration advantageously prevents extra cycles from being lost due to processor interruptions.

Figure 4:
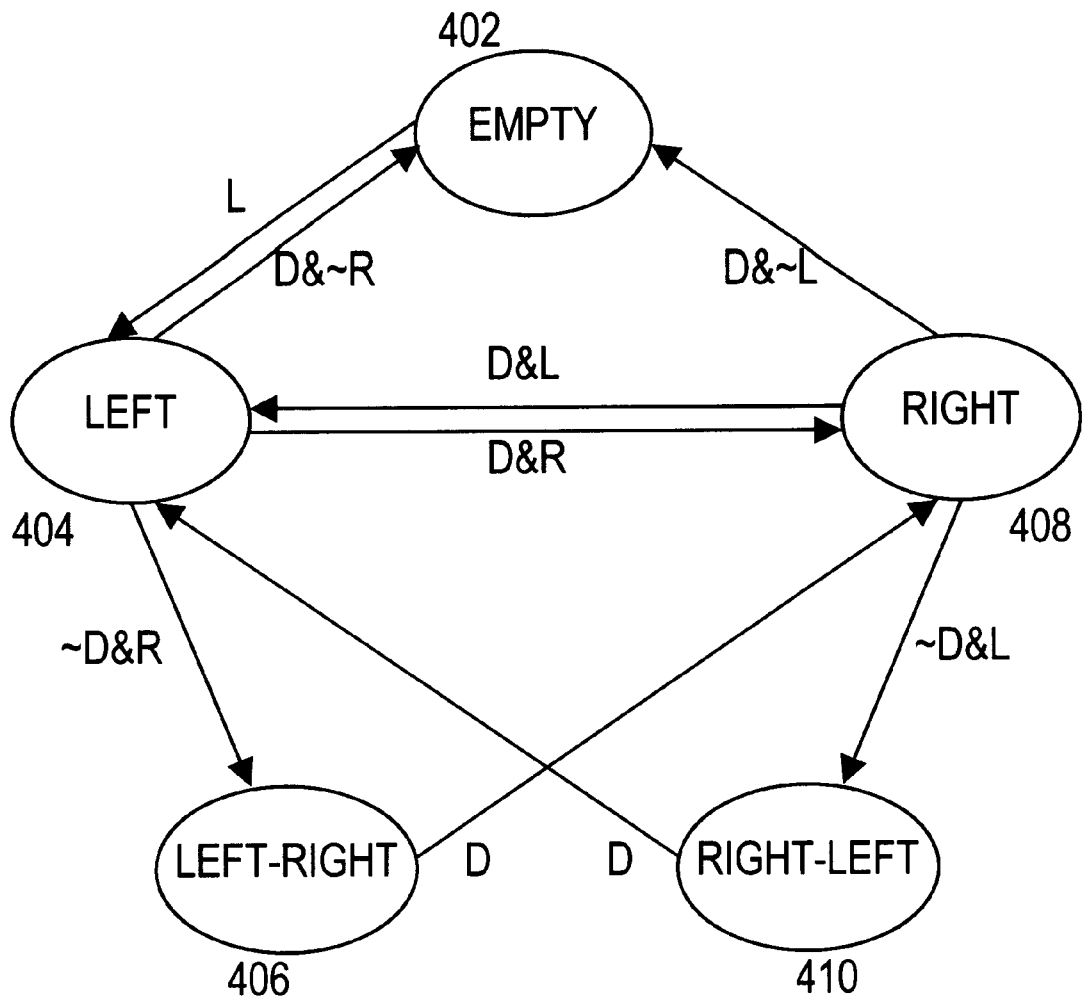
FIG. 4 is an exemplary state diagram of the memory interface controller of FIG. 3.

The operation of controller 308 is shown by an example state diagram in FIG. 4. In one embodiment, controller 308 has five states: empty state 402, left state 404, left-right state 406, right state 408, and right-left state 410. Empty state 402 corresponds to the situation in which both latches are empty. Left state 404 corresponds to the situation in which the left latch 310 only is holding data. Left-right state 406 corresponds to the situation in which the left latch 310 is holding data which precedes data held in the right latch 312. Right state 408 corresponds to the situation in which the right latch 312 only is holding data. Right-left state 410 corresponds to the situation in which the right latch 312 is holding data which precedes data held in the left latch 310. The multiplexer 314 is set to forward data to the processor 102 from the left latch 304 when the controller 308 is in the left state 404 and the left-right state 406, and set to forward data from the right latch 312 in the right state 408 and the right-left state 410.

In one embodiment, controller 308 generates three logic signals: Load Left (L), Load Right (R), and Output Data (D). When Load Left is asserted, it indicates that data from memory is being latched into the left latch 310. Similarly, when Load Right is asserted, it indicates that data from memory is being latched into the right latch 312. When Output Data is asserted, it indicates that processor 102 has accepted data from one of the latches. The logic signals can be determined from the controller state and the valid data signal from memory and the ready signal from the processor:

$$D = (STATE! = EMPTY) \& (RDY \& \sim VALID)$$

$$L = VALID \& ((STATE == EMPTY) | (STATE == RIGHT))$$

$$R = VALID \& ((STATE == LEFT)$$

Controller 308 begins in the EMPTY state 402. As shown in FIG. 4, if the load left signal L is asserted, the controller moves to LEFT state 404. Then if the load right signal R is asserted and the output data signal D is de-asserted the controller moves to the LEFT-RIGHT state 406. If instead the load right signal R is asserted and the output data signal is also asserted, the controller moves to RIGHT state 408. Otherwise if the load right signal R is de-asserted and the output data signal D is asserted, then the controller returns to EMPTY state 402.

From the RIGHT state 408, the controller moves to RIGHT-LEFT state 410 if the load left signal L is asserted and the output data signal is de-asserted. If instead the load left signal L is asserted and the output data signal D is asserted, then the controller moves back to the LEFT state 404. Otherwise if the load left signal L is de-asserted and the output data signal D is asserted, then the controller returns to the EMPTY state 402.

From the LEFT-RIGHT state 406, the controller moves to the RIGHT state 208 when the output data signal D is asserted. Similarly, from the RIGHT-LEFT state 410, the controller moves to the left state when the output data signal D is asserted.

Figure 2C:
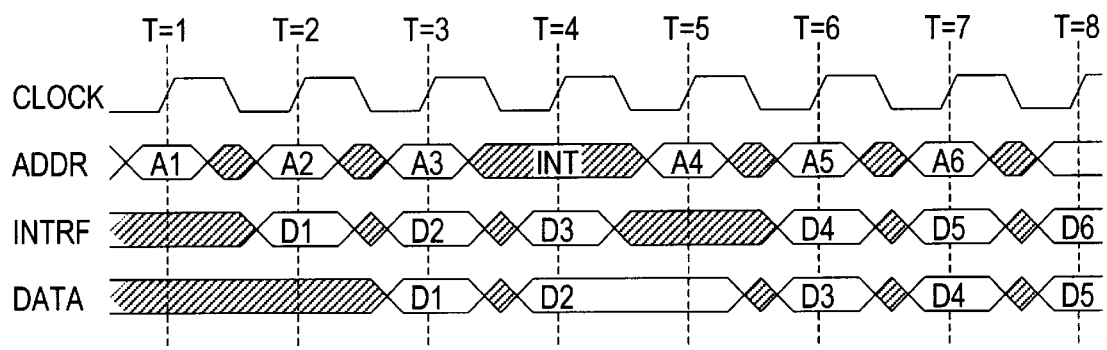
FIG. 2c illustrates the timing requirement for a system having an improved memory interface to a synchronous burst SRAM.

Returning to FIG. 2C, an illustration of the signal timing of the system in FIG. 3 is shown. At times T=1,2,3, processor 102 provides addresses A1, A2, and A3. Memory 106 provides the corresponding data D1, D2, and D3 to memory interface 304 at times T=2,3,4. The interface 304 provides the data to processor 102 at times T=3,4,5. Again, assume that the processor 102 is interrupted at time T=4. Since the processor 102 is unable to accept the data D2 which is available at time T=4, the memory interface 304 continues to hold it, and data D3 is latched in the available latch.

Hence, after the interruption is concluded, processor 102 is able to continue on with address A4 at time T=5. The processor is able to receive data D3 at time T=6 rather than at time T=5. Consequently, in this configuration an n-cycle interrupt in the processor causes only an n-cycle interruption in the data flow. In a system with frequent short interrupts this provides a significant increase in the data bandwidth.

Numerous variations and modifications will become apparent to those skilled in the art once the above disclosure is fully appreciated. It is intended that the following claims be interpreted to embrace all such variations and modifications.

What is claimed is:

1. An information processing system which comprises:
   a memory configured to store data in memory locations having addresses;
   a processor configured to retrieve data from the memory by providing addresses to the memory; and
   a memory interface coupled between the processor and the memory, wherein the memory interface comprises:
   a left data latch configured to latch data provided by the memory and configured to unlatch only if the processor accepts the latched data from the left data latch;
   a right data latch configured to latch data provided by the memory only if the left data latch is already latched, and configured to unlatch only if the processor accepts the latched data from the right data latch; and
   a multiplexer coupled to the left data latch and the right data latch to receive latched data, wherein the multiplexer is coupled to the processor to forward latched data from the data latch which is least recently latched.

2. The information processing system of claim 1, wherein the memory interface includes a controller configured to determine a interface state indicative of whether the left and right data latches are latched.

3. The information processing system of claim 2, wherein the interface state is further indicative of which data latch is least recently latched.

4. An information processing system which comprises:
   a memory configured to store data in memory locations having addresses;
   a processor configured to retrieve data from the memory by providing addresses to the memory; and
   a memory interface coupled between the processor and the memory, wherein the memory interface comprises:
   a left data latch configured to latch data provided by the memory and configured to unlatch only if the processor accepts the latched data from the left data latch;
   a right data latch configured to latch data provided by the memory only if the left data latch is already latched, and configured to unlatch only if the processor accepts the latched data from the right data latch;
   a multiplexer coupled to the left data latch and the right data latch to receive latched data, wherein the multiplexer is coupled to the processor to forward latched data from the data latch which is least recently latched; and
   a controller configured to determine an interface state indicative of whether the left and right data latches are latched, wherein the controller is further configured to generate an output data signal D which is asserted if: (i) the processor asserts a ready signal; (ii) the memory de-asserts a valid-data signal; and (iii) at least one of the data latches is latched.

5. The information processing system of claim 4, wherein the memory interface controller is further configured to generate a load-left signal L which is asserted if the memory asserts a valid-data signal and the left data latch is not latched.

6. The information processing system of claim 5, wherein the left data latch is coupled to the memory interface controller to receive the load-left signal L and wherein the left data latch is configured to latch data from the memory when the load-left signal L is asserted.

7. The information processing system of claim 6, wherein the left data latch is configured to unlatch if the output data signal D is asserted and the interface state indicates that the left data latch is the data latch least recently latched.

8. The information processing system of claim 4, wherein the memory interface controller is further configured to generate a load-right signal R which is asserted if the memory asserts a valid-data signal and only the left data latch is latched.

9. A memory interface which comprises:
   a memory interface controller configured to receive a valid-data signal from a memory device and a ready signal from a processor, wherein the memory interface controller is configured to generate a load-left signal, a load-right signal, and a multiplexer control signal;
   a left data latch coupled to the memory interface controller to receive the load-left signal and configured to latch data from the memory if the load-left signal is asserted;
   a right data latch coupled to the memory interface controller to receive the load-right signal and configured to latch data from the memory if the load-right signal is asserted;
   a multiplexer coupled to the memory interface controller to receive the multiplexer control signal and configured to forward to the processor latched data from the data latch indicated by the multiplexer control signal,
   wherein the memory interface controller is configured to generate an interface state indicative of which data latches are holding data, wherein the interface state is further indicative of which data latch holding data is least recently latched,
   wherein the memory interface controller is configured to assert the load-left signal if the valid data signal is asserted and if the interface state is indicative that the left data latch is not latched,
   wherein the memory interface controller is configured to assert the load-right signal if the valid data signal is asserted and if the interface state is indicative that only the right data latch is not latched, and
   wherein the memory interface controller is configured to assert an output data signal if the valid data signal is de-asserted and the ready signal is asserted.

10. An information processing system which comprises:
    a memory configured to store data in memory locations having addresses;
    a processor configured to retrieve data from the memory by providing addresses to the memory; and
    a memory interface coupled between the processor and the memory, wherein the memory interface comprises:
    a left data latch configured to latch data provided by the memory and configured to unlatch if the processor accepts the latched data from the left data latch;

a right data latch configured to latch data provided by the memory if the left data latch is already latched, and configured to unlatch if the processor accepts the latched data from the right data latch;

a multiplexer coupled to the left data latch and the right data latch to receive latched data, wherein the multiplexer is coupled to the processor to forward latched data from the data latch which is least recently latched; and a controller configured to determine an interface state indicative of whether the left and right data latches are latched, wherein the interface state is further indicative of which data latch is least recently latched, wherein the controller is further configured to generate an Output Data signal D which is asserted if: the processor asserts a ready signal; (ii) the memory de-asserts a valid-data signal; and (iii) at least one of the data latches is latched, and wherein the left data latch is configured to unlatch if the output data signal D is asserted and the interface state indicates that the left data latch is the data latch least recently latched.

* * * * *